United States Patent
Yan

(10) Patent No.: US 9,994,147 B2
(45) Date of Patent: Jun. 12, 2018

(54) COLLISION AVOIDANCE SYSTEM FOR VEHICLES

(71) Applicant: DENSO International America, Inc., Southfield, MI (US)

(72) Inventor: Yu Yan, Dearborn, MI (US)

(73) Assignee: DENSO International America, Inc., Southfield, MI (US)

( * ) Notice: Subject to any disclaimer, the term of this patent is extended or adjusted under 35 U.S.C. 154(b) by 49 days.

(21) Appl. No.: 15/260,522

(22) Filed: Sep. 9, 2016

(65) Prior Publication Data

US 2018/0072220 A1 Mar. 15, 2018

(51) Int. Cl.
*B60Q 1/46* (2006.01)
*G08G 1/16* (2006.01)

(52) U.S. Cl.
CPC ............... *B60Q 1/46* (2013.01); *G08G 1/166* (2013.01); *B60Q 2400/50* (2013.01)

(58) Field of Classification Search
CPC ....... B60Q 1/46; B60Q 2400/50; G08G 1/166
See application file for complete search history.

(56) References Cited

U.S. PATENT DOCUMENTS

| | | | | |
|---|---|---|---|---|
| 2,023,845 A | * | 12/1935 | Larose | B60Q 1/2607 40/556 |
| 5,963,345 A | * | 10/1999 | Smith | B60Q 1/50 359/1 |
| 2002/0104242 A1 | * | 8/2002 | Haugen | G09F 21/02 40/606.14 |
| 2005/0117364 A1 | * | 6/2005 | Rennick | B60R 1/1207 362/540 |
| 2007/0053195 A1 | * | 3/2007 | Alberti | B60Q 1/2665 362/494 |
| 2009/0013922 A1 | * | 1/2009 | Lin | B60Q 1/38 116/28 R |
| 2010/0315216 A1 | * | 12/2010 | Hada | B60Q 1/525 340/436 |
| 2011/0273671 A1 | * | 11/2011 | Chu | G03B 21/14 353/13 |
| 2012/0020101 A1 | * | 1/2012 | Pastrick | B60Q 1/2665 362/494 |
| 2015/0203023 A1 | | 7/2015 | Marti et al. | |
| 2016/0027350 A1 | * | 1/2016 | Stockton | G09F 13/005 40/544 |

FOREIGN PATENT DOCUMENTS

| | | | | |
|---|---|---|---|---|
| FR | 2967625 A1 | * | 5/2012 | ............... B60Q 1/50 |
| JP | 2009012676 A | | 1/2009 | |
| JP | 2012108706 A | | 6/2012 | |
| JP | 2015102807 A | * | 6/2015 | |
| KR | 19980022402 A | | 7/1998 | |

* cited by examiner

*Primary Examiner* — Sisay Yacob
(74) *Attorney, Agent, or Firm* — Harness, Dickey & Pierce, P.L.C.

(57) ABSTRACT

A collision avoidance system including a proximity sensor for a lead vehicle configured to determine an actual distance between the lead vehicle and a following vehicle. A projector for the lead vehicle is configured to project, above ground level, an image from the lead vehicle towards the following vehicle to notify the following vehicle of the lead vehicle. A control module for the lead vehicle is configured to instruct the projector to project the image when the actual distance is less than a threshold safety distance.

19 Claims, 3 Drawing Sheets

COLLISION AVOIDANCE SYSTEM FOR VEHICLES

FIELD

The present disclosure relates to a collision avoidance system for vehicles, the system including a holographic projector configured to project an image from a lead vehicle to a following vehicle.

BACKGROUND

This section provides background information related to the present disclosure, which is not necessarily prior art.

Current vehicle safety systems are configured to inform a driver when his or her vehicle is too close to another vehicle, thereby giving the driver time to take evasive action as necessary. While current safety systems are suitable for their intended use, they are subject to improvement. For example, it would be desirable to have a safety system, which when included with a subject vehicle, helps drivers of vehicles surrounding the subject vehicle keep a safe distance from the subject vehicle. The present teachings satisfy this need in the art, as well as numerous other needs.

SUMMARY

This section provides a general summary of the disclosure, and is not a comprehensive disclosure of its full scope or all of its features.

The present teachings provide for a collision avoidance system having a projector configured to project, above ground level, an image from a lead vehicle towards a following vehicle to notify the following vehicle of the presence of the lead vehicle, and to help the driver of the following vehicle maintain a safe distance from the lead vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
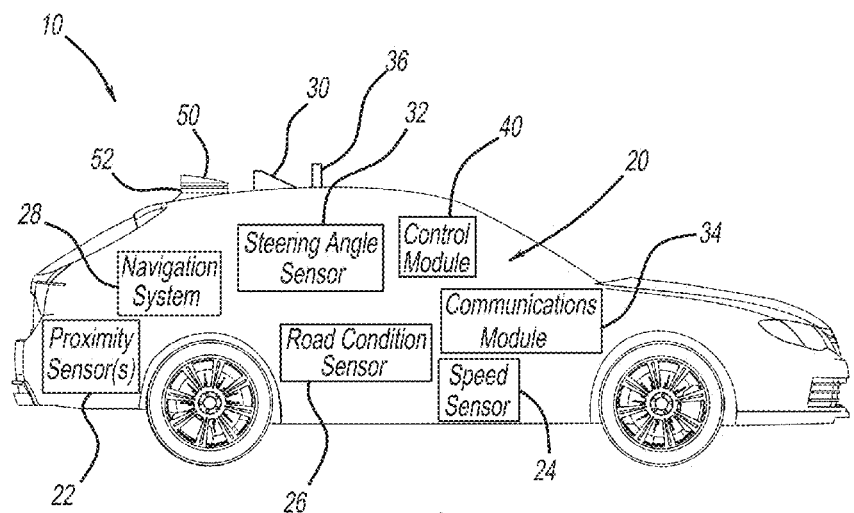
FIG. 1 illustrates a vehicle including a collision avoidance system according to the present teachings.

With initial reference to FIG. 1, an exemplary vehicle 10 is illustrated, which includes a collision avoidance system 20 according to the present teachings. Although the vehicle 10 is illustrated as a passenger vehicle, the collision avoidance system 20 can be configured for use with any other suitable vehicle, such as any suitable mass transit vehicle, recreational vehicle, military vehicle, construction vehicle/equipment, watercraft, etc.

The collision avoidance system 20 includes proximity sensors 22. The proximity sensors 22 can be any suitable sensors configured for measuring distance between the vehicle 10 and surrounding vehicles, such as a following vehicle 120 illustrated in FIG. 3. The proximity sensors 22 can be, for example, any suitable lidar sensors, sonar sensors, radar sensors, optical sensors, etc. The proximity sensors 22 can be located at any suitable positions about the vehicle 10, such as at a rear thereof.

The collision avoidance system 20 can further include a speed sensor 24. The speed sensor 24 can be any suitable sensor configured to determine the speed of the vehicle 10. The collision avoidance system 20 further includes a road condition sensor 26, which is configured to sense road conditions that the vehicle 10 is traveling across. The road condition sensor 26 can be any suitable sensor. For example, the road condition sensor 26 can be a sensor configured to sense when tires of the vehicle 10 slip, thereby indicating that the vehicle 10 is traveling across a slick surface, such as a snow covered road, a wet road, or an oil slick.

The collision avoidance system 20 further includes a navigation system 28. The navigation system 28 is any suitable navigation system configured to navigate the vehicle 10 and determine the location thereof. The navigation system 28 can include GPS navigation. A transmitter/receiver 30, which is also configured as a GPS antenna, receives signals from orbiting satellites or any other suitable source. The signals are input to the navigation system 28. Based on these inputs, the navigation system 28 can determine the location of the vehicle 10. The navigation system 28 includes, or has access to, a map database. Using the map database and the position of the vehicle 10, the navigation system 28 is configured to determine the type of road that the vehicle 10 is traveling across.

The collision avoidance system 20 further includes a steering angle sensor 32, which is configured to determine the steering angle of the vehicle 10. The steering angle sensor 32 can be any sensor suitable to determine the steering angle of the vehicle 10. The steering angle sensor 32 can generate outputs that facilitate determination of the direction that the vehicle 10 is traveling.

Communications module 34 can be any suitable communications module configured to transmit and receive information, such as by way of the transmitter/receiver 30. For example, the communications module 34 can be configured to receive weather data broadcast from any suitable source. The communications module 34 can also be a vehicle-to-vehicle communications module configured to receive signals from surrounding vehicles identifying whether or not surrounding vehicles are autonomously driven vehicles or not. The communications module 34 can connect to the internet in any suitable manner, so as to determine weather, traffic, and/or road conditions.

The collision avoidance system 20 also includes an air density or quality sensor 36. The air density sensor 36 can be any suitable sensor configured to measure the density and/or quality of the air about the vehicle 10. As explained further herein, the density and/or quality of the air may affect the type of image that the collision avoidance system 20 is able to project using projector 50.

The vehicle 10 further includes a control module 40. The control module 40 can be any suitable control module for controlling the collision avoidance system 20. Throughout this application, the terms "module" (such as the control module 40 and the communications module 34) and "system" may be replaced with the term "circuit." The terms module and system may refer to, be part of, or include processor hardware (shared, dedicated, or group) that executes code and memory hardware (shared, dedicated, or group) that stores code executed by the processor hardware. The code is configured to provide the features of the control module 40, as well as the collision avoidance system 20 in general.

The control module 40 is configured to receive inputs from the proximity sensors 22, the speed sensor 24, the road condition sensor 26, the navigation system 28, the steering angle sensor 32, and the communications module 34. The control module 40 is further configured to control one or more of the proximity sensors 22, the speed sensor 24, the road condition sensor 26, the navigation system 28, the steering angle sensor 32, the communications module 34, and the air density sensor 36 to provide the features of the collision avoidance system 20 set forth herein.

Figure 2A:
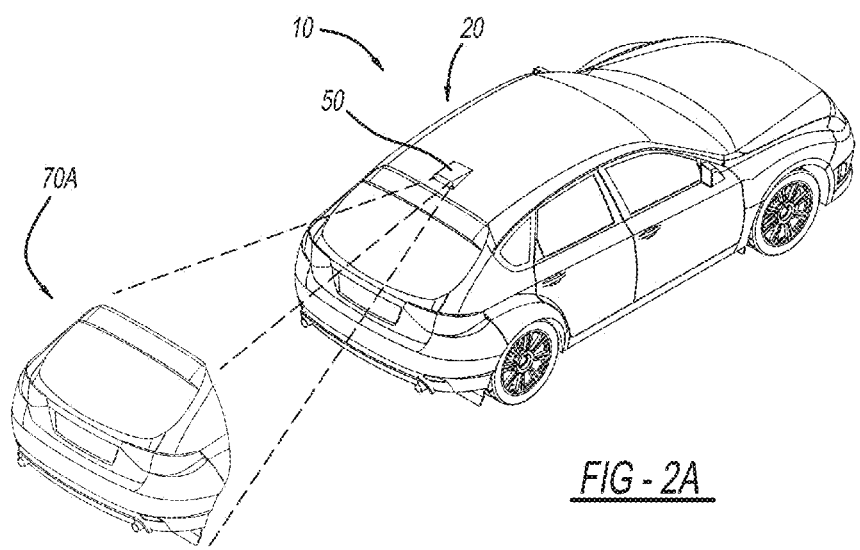
FIG. 2A illustrates a projected image generated by the collision avoidance system, the projected image taking the form of a rear end of the vehicle.
Figure 2B:
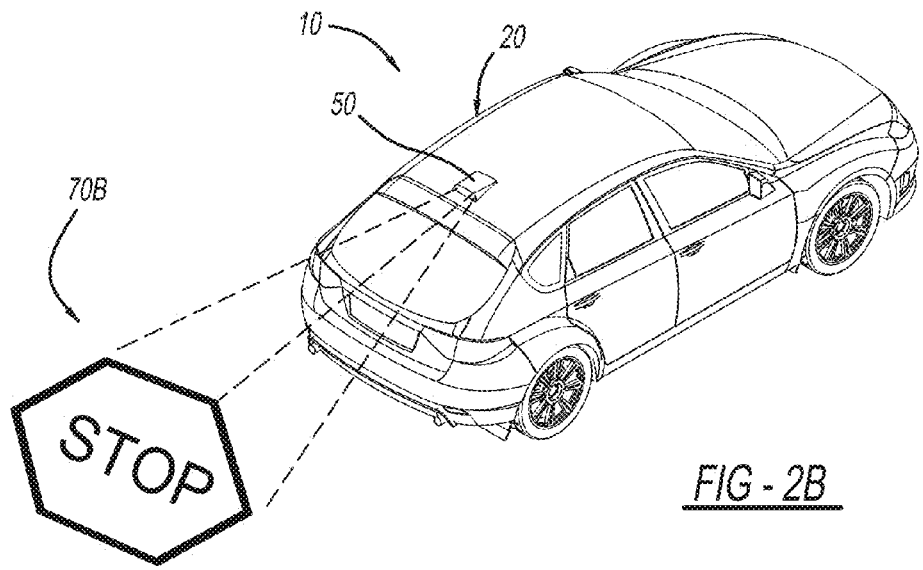
FIG. 2B illustrates the projected image in the form of a stop sign.
Figure 2C:
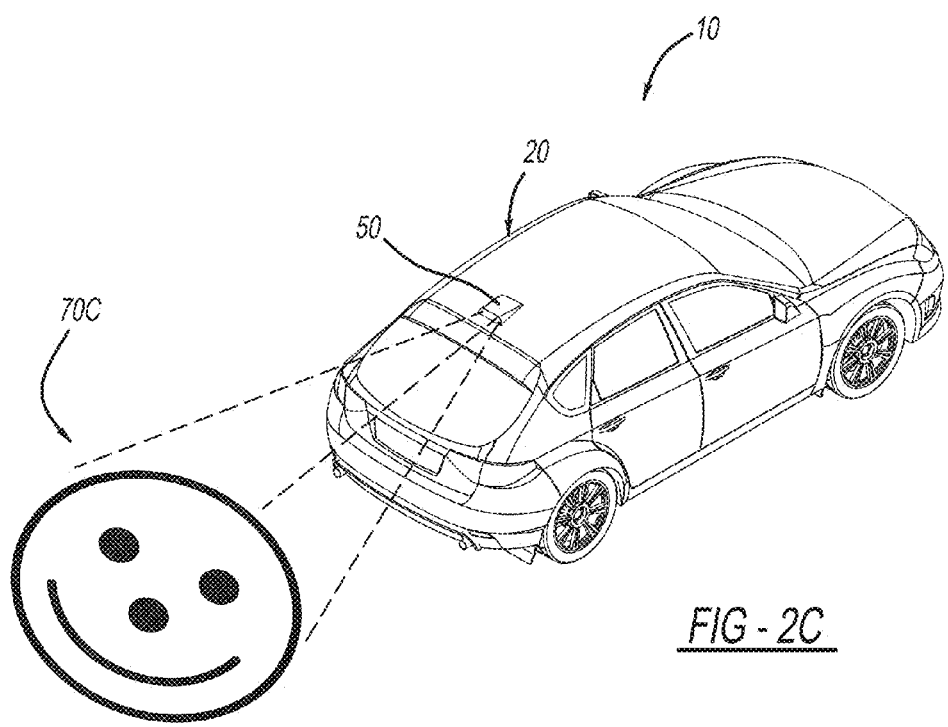
FIG. 2C illustrates the projected image in the form of an emoji.

The collision avoidance system 20 further includes a projector 50, which can be mounted to the vehicle 10 in any suitable manner, such as with projector mount 52. The projector 50 is any suitable projector configured to project images from the vehicle 10 to notify surrounding vehicles of the vehicle 10, and/or to convey information to the surrounding vehicles. The projector 50 is configured to project images above ground, such as above a road surface. The projector 50 can be, for example, any suitable holographic projector, such as a laser projector. The projector 50 is configured to project any suitable image, such as the projected image 70A of FIG. 2A, which is a virtual, three-dimensional, image of a rear portion of the vehicle 10. The projected image may also take the form of a stop sign 70B, as illustrated in FIG. 2B, an emoji 70C as illustrated in FIG. 2C (such as a smiling face thanking another driver for his or her courtesy), or any other suitable image.

The density and/or quality of the air about the vehicle 10 may have a bearing on the type and/or quality of image that the projector 50 is able to visibly project. For example, if the air is smoky or foggy, the projector 50 may be unable to project, in a manner that is clearly visible, a colorful and complex image, such as the virtual image of the rear portion of the vehicle 10. Instead, only a less complex bicolor image, such as the stop sign of image 70B (FIG. 2B) may be visible. Thus, if based on inputs from the air density sensor 36 the control module 40 determines that the air is too foggy or smoky for a complex image to be visible, the control module 40 can operate the projector 50 to only project a less complex bicolor image, such as the stop sign of FIG. 70B.

The projector mount 52 can be any suitable projector mount configured to rotate the projector 50 to allow the projector 50 to display the projected image 70A-70C at any suitable location about the vehicle 10. For example, the projector mount 52 can be configured to rotate the projector 50 to display the projected image 70A-70C at a rear, a side, or above the vehicle 10, or at any other suitable position about the vehicle 10. The projector 50 can also be configured to project the projected image 70A-70C at any location about the vehicle 10 without being rotated by the projector mount 52, and thus the projector 50 can be a 360° projector, for example.

Figure 3:
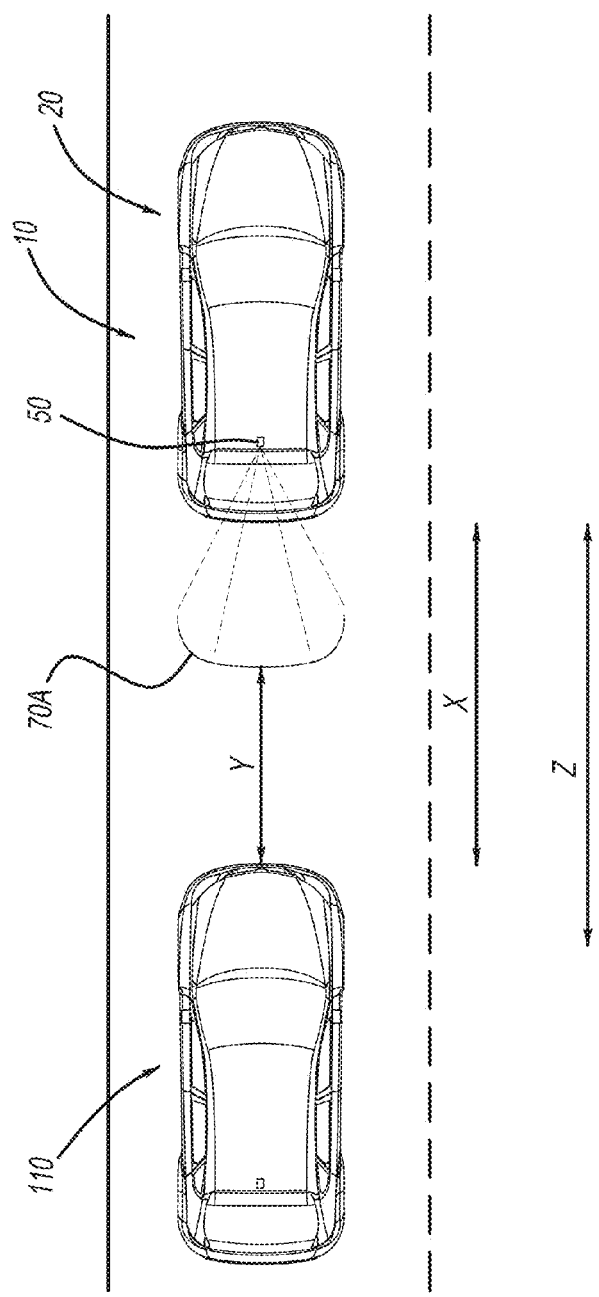
FIG. 3 illustrates the vehicle of FIG. 1 with the collision avoidance system thereof projecting an image of a rear portion of the vehicle such that the driver of a following vehicle perceives the distance between the vehicles to be less than an actual distance between the vehicles.

With reference to FIG. 3, the vehicle 10 is illustrated as a lead vehicle in front of a following vehicle 110. The lead vehicle 10 includes the collision avoidance system 20 and the projector 50 thereof. Distance X is an actual distance between the lead vehicle 10 and the following vehicle 110. Distance Y is the distance between the projected image 70A and the following vehicle 110, and is thus a perceived distance (as perceived by a driver of the following vehicle 110) between the lead vehicle 10 and the following vehicle 110. Distance Z is a threshold safety distance between the lead vehicle 10 and the following vehicle 110. The threshold safety distance Z can be any suitable distance, such as any suitable predetermined distance, whereby when the actual distance X is less than the threshold safety distance Z the control module 40 instructs the projector 50 to project the projected image 70A, or any other suitable image. The collision avoidance system 20 determines the proximity of the following vehicle 110 to the lead vehicle 10 using the proximity sensors 22.

The control module 40 is configured to establish the threshold safety distance Z for the following vehicle 110 in any suitable manner. For example, if based on inputs from the speed sensor 24 the control module 40 determines that the vehicle 10 is traveling at a high rate of speed, the control module 40 can increase the threshold safety distance Z so that the projector 50 will display the projected image 70A when the vehicles 10 and 110 are further apart in order to compensate for the decreased stopping distance typically associated with higher speeds. The distance that the projected image 70A is projected from the vehicle 10 may also be increased, thereby increasing the perceived distance Y. The control module 40 can also increase the threshold safety distance Z, as well as the distance that the projected image 70A is projected from the lead vehicle 10, under any one or more of the following conditions: when the road condition sensor 26 determines that the road conditions are slippery or otherwise poor, thus resulting in increased stopping distances; when the navigation system 28 determines that the vehicle 10 is on a highway, which typically leads to higher speeds and decreased stopping distances; and/or when the communications module 34 receives information indicating poor weather conditions and/or poor traffic conditions that typically result in increased stopping distances.

The projected image 70A can be displayed any suitable distance from a rear of the lead vehicle 10 such that a driver of the following vehicle 110 perceives the lead vehicle 10 to be closer to the following vehicle 110 than the actual distance X. As a result, the driver of the following vehicle 110 should increase his or her following distance, thereby enhancing safety. More specifically, due to the projected image 70A, the driver of the following vehicle 110 will believe that the distance between the vehicles 10 and 110 is perceived distance Y, which is the distance between the projected image 70A and the following vehicle 110, and which is less than the actual distance X.

The control module 40 is further configured to set the threshold safety distance Z based on relative speed of the lead vehicle 10 with respect to the following vehicle 110. For example, if the lead vehicle 10 is stopped, such as at a stoplight, and the following vehicle 110 is approaching the lead vehicle 10 at an unreasonably high rate of speed, the control module 40 is configured to command the projector 50 to display the projected image 70A at a greater distance from the lead vehicle 10 as compared to if the lead vehicle 10 were moving. Thus the following vehicle 110 will believe that the lead vehicle 10 is closer than it actually is, which should result in the following vehicle 110 safely stopping prior to reaching the lead vehicle 10.

If based on inputs from the proximity sensors 22 the control module 40 determines that the following vehicle 110 has stopped and the lead vehicle 10 is in reverse gear, the control module 40 will not instruct the projector 50 to display the projected image 70A even when the actual distance X is less than the threshold safety distance Z. When the vehicle 10 is stopped, such as at a stoplight, the control module 40 can instruct the projector 50 to display the projected image 70B in the form of a stop sign when the actual distance X is less than the threshold safety distance Z, thereby informing the driver of the following vehicle 110 that he or she should stop the following vehicle 110 because the lead vehicle 10 has stopped.

The control module 40 is further configured to command the projector 50 to rotate the projected image 70A-70C when the vehicle 10 is rounding a curve as detected by the steering angle sensor 32. The projected image 70A-70C is rotated, for example, such that it is generally centered in front of the following vehicle 110 as the vehicles 10 and 110 are rounding a curve. The control module 40 can also instruct the projector 50 to rotate the projected image 70A-70C when the lead vehicle 10 is changing lanes, such as determined by a change in steering angle detected by the steering angle sensor 32. When the vehicle 10 is changing lanes, the control module 40 can command the projector 50 to display an image in the form of a turn signal directional to facilitate merging of the vehicle 10 into an adjacent lane. After the vehicle 10 has merged into the adjacent lane, the control module 40 can command the projector 50 to display a show of appreciation to surrounding drivers, such as the smiley face emoji 70C of FIG. 2C.

The control module 40 is further configured to not operate the projector 50 when the following vehicle 110 is an autonomously driven vehicle. For example, when the communications module 34 receives signals by way of the transmitter/receiver 30 from the following vehicle 110 indicating that the following vehicle 110 is being autonomously driven, the control module 40 will not activate the projector 50 because such a warning system should be unnecessary.

The present teachings thus advantageously provide for a collision avoidance system 20, which is configured to project images, such as three-dimensional holographic images, that notify following vehicle 110 of the presence of lead vehicle 10, and/or convey information to the following vehicle 110. In the examples of FIG. 2A and FIG. 3, the lead vehicle 10 projects projected image 70A, which is a virtual, three-dimensional, image of a rear of the lead vehicle 10 projected above the road surface. The projected image 70A results in the driver of the following vehicle 110 seeing perceived distance Y between the vehicles 10 and 110, which is less than actual distance X. Therefore, the driver of the following vehicle 110 will likely stop a safe distance from the vehicle 10. The projected image 70A can be any suitable projected image. For example, FIG. 2B illustrates projected image 70B in the form of a stop sign instructing the driver of the following vehicle 110 to stop, and FIG. 2C illustrates projected image 70C in the form of a smiley face emoji thanking the driver of the following vehicle 110 for his or her courtesy.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A collision avoidance system comprising:
    a proximity sensor for a lead vehicle configured to determine an actual distance between the lead vehicle and a following vehicle;
    a projector for the lead vehicle that is configured to project, above ground level, an image from the lead vehicle towards the following vehicle to notify the following vehicle of the lead vehicle; and
    a control module for the lead vehicle configured to instruct the projector to project the image when the actual distance is less than a threshold safety distance;
    wherein the projector is configured to project a virtual image of a rear portion of the lead vehicle to make the lead vehicle appear closer to the following vehicle than the actual distance.

2. The collision avoidance system of claim 1, wherein the proximity sensor includes at least one of a sonar sensor, a radar sensor, and a lidar sensor.

3. The collision avoidance system of claim 1, wherein the projector is a holographic projector.

4. The collision avoidance system of claim 1, wherein the projector is a laser projector.

5. The collision avoidance system of claim 1, wherein the projector is configured to rotate to project the image beyond a rear of the lead vehicle, beyond a left side of the lead vehicle, or beyond a right side of the lead vehicle.

6. The collision avoidance system of claim 1, wherein the projector is configured to project a stop sign.

7. The collision avoidance system of claim 1, wherein the projector is configured to project at least one of an emoji and a lane change directional indicator.

8. The collision avoidance system of claim 1, wherein the control module is configured to increase the threshold safety distance when road conditions increase vehicle stopping distance.

9. The collision avoidance system of claim 1, wherein the control module is configured to increase the threshold safety distance when the lead vehicle is traveling on a highway.

10. The collision avoidance system of claim 1, wherein the control module is configured to increase the threshold safety distance when a relative speed between the lead vehicle and the following vehicle is above a predetermined threshold.

11. The collision avoidance system of claim 1, wherein the control module is configured to increase the threshold safety distance when the lead vehicle is traveling through a curve.

12. The collision avoidance system of claim 1, wherein the control module is configured to deactivate the projector when at least one of:
    the following vehicle is stopped; and
    the following vehicle is autonomously driven.

13. The collision avoidance system of claim 1, wherein the control module is configured to control the projector to modify the image based on weather conditions.

14. A method for notifying a following vehicle of the presence of a lead vehicle, the method comprising:
    measuring an actual distance between the lead vehicle and the following vehicle with a proximity sensor of the lead vehicle;
    projecting an image from a projector of the lead vehicle towards the following vehicle, to a point above ground level, to notify the following vehicle of the lead vehicle when the actual distance is less than a threshold safety distance; and
    projecting an image of a rear portion of the lead vehicle with the projector.

15. The method of claim 14, further comprising projecting a stop sign with the projector.

16. The method of claim 14, further comprising rotating the projector to project the image beyond at least one of a rear of the lead vehicle, a right side of the lead vehicle, and a left side of the lead vehicle.

17. The method of claim 14, further comprising decreasing the threshold safety distance when environmental conditions reduce stopping distance of the following vehicle relative to the lead vehicle.

18. The method of claim 14, further comprising rotating the projector to rotate the image when at least one of the lead vehicle is rounding a curve and the lead vehicle is changing lanes.

19. A method for notifying a following vehicle of the presence of a lead vehicle, the method comprising:
    measuring an actual distance between the lead vehicle and the following vehicle with a proximity sensor of the lead vehicle;
    projecting an image from a projector of the lead vehicle towards the following vehicle, to a point above ground level, to notify the following vehicle of the lead vehicle when the actual distance is less than a threshold safety distance; and
    rotating the projector to rotate the image when at least one of the lead vehicle is rounding a curve and the lead vehicle is changing lanes.

* * * * *